United States Patent [19]
Arbiter et al.

[11] Patent Number: 5,228,015
[45] Date of Patent: Jul. 13, 1993

[54] MUSICAL REPRODUCTION UNIT

[75] Inventors: Ivor Arbiter, London; Bernard P. Hart, West Yorkshire, both of England

[73] Assignee: Your Electronics Specialists Limited, West Yorkshire, Great Britain

[21] Appl. No.: 925,518

[22] Filed: Aug. 5, 1992

Related U.S. Application Data

[63] Continuation of Ser. No. 530,006, May 29, 1990, abandoned.

[30] Foreign Application Priority Data

Dec. 22, 1989 [GB] United Kingdom ............... 8929061

[51] Int. Cl.⁵ ............................................. G11B 17/22
[52] U.S. Cl. ...................................... 369/33; 369/34; 369/36
[58] Field of Search ................. 369/30, 34, 35, 33, 369/36, 37, 38, 39, 32; 340/712, 706

[56] References Cited

U.S. PATENT DOCUMENTS

| | | | |
|---|---|---|---|
| 2,927,796 | 3/1960 | Silverstein | 369/36 |
| 3,129,005 | 4/1964 | Rockola | 369/37 |
| 3,662,344 | 5/1982 | Menke | 369/34 |
| 3,800,285 | 3/1974 | Peschke et al. | 369/34 |
| 3,990,710 | 11/1976 | Hughes | 369/30 |
| 4,314,366 | 2/1982 | Galia | 369/30 |
| 4,414,467 | 11/1983 | Gould et al. | 235/381 |
| 4,476,463 | 10/1984 | Ng et al. | 340/172 |
| 4,647,989 | 3/1987 | Geddes | 369/30 |
| 4,667,802 | 5/1987 | Verduin | 194/217 |
| 4,706,233 | 11/1987 | d'Alayer de Costemore d'Arc | 369/30 |
| 4,740,938 | 4/1988 | Bierhoff et al. | 369/30 |
| 4,831,758 | 5/1989 | Williams et al. | 40/510 |
| 4,926,326 | 5/1990 | McKinley | 364/410 |
| 5,031,346 | 7/1991 | Herring et al. | 40/463 |

FOREIGN PATENT DOCUMENTS

| | | |
|---|---|---|
| 0313359 | 10/1988 | European Pat. Off. . |
| 0342002 | 10/1989 | European Pat. Off. . |
| 3813626 | 11/1989 | Fed. Rep. of Germany . |
| 2623000 | 11/1988 | France . |
| WO86/01326 | 2/1986 | PCT Int'l Appl. . |
| 2210724 | 8/1987 | United Kingdom . |
| 2204180 | 11/1988 | United Kingdom . |
| 2211977 | 11/1988 | United Kingdom . |
| 2234386 | 10/1989 | United Kingdom . |

*Primary Examiner*—Eugene R. LaRoche
*Assistant Examiner*—Tan Nguyen
*Attorney, Agent, or Firm*—Baker & Daniels

[57] ABSTRACT

A number of digitally encoded records (12) are loaded in a reproduction apparatus (13), such as a compact disc juke box. Covers (14) corresponding to the records (12) are photographically reduced in size. The photographically reduced covers are mounted on the reproduction apparatus so that the user can choose a particular record to be played by selecting the corresponding cover. In one example the covers (14) are arranged in a regular grid and the reproduction apparatus (13) is programmed with data correlating positions of covers in the grid with the corresponding records. The data may be provided in a programmable data cartridge (8). The grid (T) may have a touch-sensitive device (15,16) associated with it. Alternatively the user may use a numeric keypad to indicate the selected cover.

16 Claims, 7 Drawing Sheets

MUSICAL REPRODUCTION UNIT

This is a continuation of application Ser. No. 07/530,006, filed May 29, 1990 abandoned.

FIELD OF THE INVENTION

The present invention relates to a reproduction apparatus for playing digitally encoded records and to a method of controlling such an apparatus.

CD juke boxes are known in which a track on one of a number of compact disc is selected and played after the payment of a charge using a conventional coin freed system. The high information density of digital storage media such as compact discs makes possible a selection from a very large number of tracks. As a result, it important to provide a system with appropriate ergonomics to aid selection of tracks by the user. There is an associated problem in displaying all of the many choices available to the user.

The applicants' earlier European application number EP-A-0313359 discloses a CD juke box which uses a programmable control unit and a visual display unit (VDU) which displays a scrolling menu of titles from which the user makes a selection. The data for the titles is stored in a detachable cartridge which is replaced when the compact discs in the juke box are changed.

Although this system goes some way to providing the required ergonomic qualities, in practice the process of choosing titles from the scrolling menu still places significant demands on the user. A further problem is that when the juke box is installed, for example, in a public house, lighting conditions may be such that the screen is difficult to read.

It is an object of the present invention to overcome these problems by making it easier for the user to make a selection.

SUMMARY OF THE INVENTION

According to a first aspect of the present invention, a method of controlling a musical reproduction unit for playing digitally encoded records comprises assembling a plurality of digitally encoded records, photographically reducing covers of said records, loading said records in a musical reproduction unit arranged to play a selected one of said records in response to a choice made by a user, and mounting said photographically reduced covers on said unit, whereby a user is enabled to choose a record by entering in said unit an indication of a corresponding cover.

The present invention provides a method of controlling a unit such as a CD juke box which offers a greatly improved man-machine interface. Rather than having to read titles from the display the user is able to select a record on the basis of the corresponding cover.

Preferably said digitally encoded records are compact discs.

Preferably the said covers are mounted on said reproduction unit in a regular array, the method further comprising programming said reproduction unit with data correlating positions of covers in said array and respective corresponding records, whereby the unit is responsive to an input from said user indicating a position of a cover to select a corresponding record for playing.

Preferably between 30 and 100 and more preferably between 50 and 100 discs are loaded in said unit, and a corresponding number of covers mounted on said unit.

Preferably said data correlating said positions and said covers is provided in a programmable data cartridge, said method further comprising fitting said programmable data cartridge to said reproduction unit.

The user may indicate a selection by, for example, entering via a keypad a number or co-ordinates of a particular position in the array. Alternatively the reproduction unit may include touch sensitive means associated with the array of covers, the user making a selection by touching the corresponding record cover, and the reproduction unit generating the appropriate control signal accordingly.

It is found that a significant further increase in ease of use may be achieved by enabling the user to make a selection simply by touching a displayed record cover. The touch-sensitive array may be used to provide the sole input for the apparatus, or alternatively may be used in conjunction with a VDU screen, the VDU screen displaying, e.g., a selection of tracks of the records selected by the user from the array of covers.

Preferably the reproduction unit includes infra-red emitters and detectors arranged along at least two edges of the array of record covers, to provide a Cartesian touch-sensitive grid having an intersection point corresponding to each cover of the array.

Preferably the reproduction unit further comprises means to illuminate a selected record cover.

Preferably title information for each record displayed is stored in a programmable cartridge and is displayed on the VDU when the respective record is selected.

As an alternative to the preferred system using infra-red sensors, the record covers may be displayed behind a transparent capacitive touch-sensitive sensor. As a further alternative a membrane-type keypad may be provided with a key underlying each cover, the cover being pushed to activate the key to select a given cover.

BRIEF DESCRIPTION OF THE DRAWINGS

An apparatus and method in accordance with the present invention will now be described in detail with reference to the figures of the accompanying drawings in which:

FIGS. 3A, 3B and 3C are diagrams illustrating the steps of photographically reducing CD covers.

DESCRIPTION OF A PREFERRED EXAMPLE

Figure 1A:
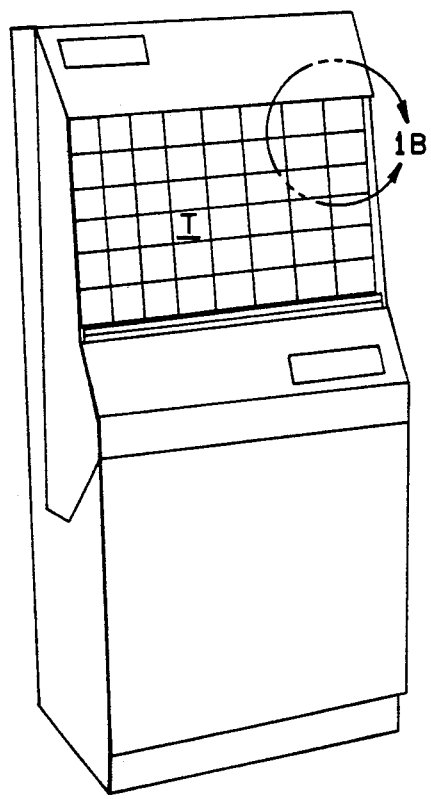
FIG. 1 is a perspective view of a reproduction unit.

A programmable reproduction system comprises a control unit 1 connected to a reproduction apparatus 2, which in the present example is a compact disc player capable of holding sixty discs, such as that marketed by Sony with the serial number CDK3000PII. The control unit 1 includes a visual display unit (VDU) 3 and a touch-sensitive grid T mounted on the unit. The grid is formed from compact disc covers which, as described in further detail below, are reproduced in reduced size, in order to allow as many as sixty covers to be mounted on the control unit 1. Infra-red emitters and sensors are arranged along the edges of the array of covers to provide a grid of corresponding pitch with an intersection point at each cover.

The control unit is also provided with a control microprocessor 11 which receives data inputs from the infra-red touch-sensors and their associated control circuitry C, from control buttons 4, which are optionally provided on the control unit in addition to the grid. The control microprocessor also receives data inputs from the data output of the compact disc player.

A data storage cartridge 8, generally similar to that described in the above-cited application, is removably mounted in the control unit, fitted to a socket 7. In addition to the features described in the above-cited application, the data storage cartridge holds a look-up table relating the different discs to the respective different positions of their covers in the array. Then, when the infra-red sensors indicate that a particular record cover has been touched, that cover is illuminated to indicate that the selection has been made and the control unit, by reference to the look-up table in the data storage cartridge 8, determines which records corresponds to the selected grid position, selects that record for playing, and displays the title of that record on the VDU 3.

In use, the reproduction unit is typically leased to the proprietor of a bar or public house. The lessor, as part of the terms of the lease, periodically replaces the discs in the machine with a new batch in the method of the present invention, at the same time a corresponding new grid of CD covers is prepared.

The compact discs 12 typically come in standard jewel-case packaging including a pictorial cover 14 provided as a removable insert. Alternatively the packaging may comprise a card envelope having the cover printed on its surface. The discs 12 are removed from the packaging and placed in a standard disc cartridge 15 for the Sony CDK3000PII player. The order in which the different discs are positioned in cartridge is noted. The corresponding covers are taken and assembled into a rectilinear grid pattern which is then photographically reduced. In the present example, the photographic reduction is carried out using a Cannon colour photocopier 16. The covers may be copied individually and the resulting reduced reproductions trimmed to size and assembled to the desired grid pattern. Preferably however the covers are arranged in the copier in a pattern corresponding to a sub-array of the final grid. In the example illustrated, six covers are arranged in the copier in a 3×2 array with cover one in the top left hand corner and cover six in the bottom right hand corner. This array is then copied with a reproduction ratio of substantially 50 percent. When the covers are to be mounted on a free-standing unit they are reduced by 50% to 60 mm × 60 mm. When a smaller unit, such as a wall mounted juke box, is to be used then they are reduced to 50 mm. This process is repeated for all the sixty covers corresponding to the discs loaded in the cartridge. The copies are then trimmed to size and mounted adhesively to a backing to form the desired grid pattern. A programmable data cartridge is programmed with title and track information for the discs in the cartridge and is also programmed with a look-up table. The look-up table for the present example is shown schematically in Table 1. In this example the positions in the grid are indicated by Cartesian co-ordinates with 1, 1 being the position corresponding to the top left hand corner, 10, 10 corresponding to the bottom right hand corner. Although in the example described the discs are loaded in the cartridge in the same order as the covers are arranged in the grid this arrangement need not necessarily be adopted and any desired mapping between the grid positions and disc order in the cartridge may be used, provided that the data in the look-up table is amended accordingly to reflect the particular mapping.

Figure 6:
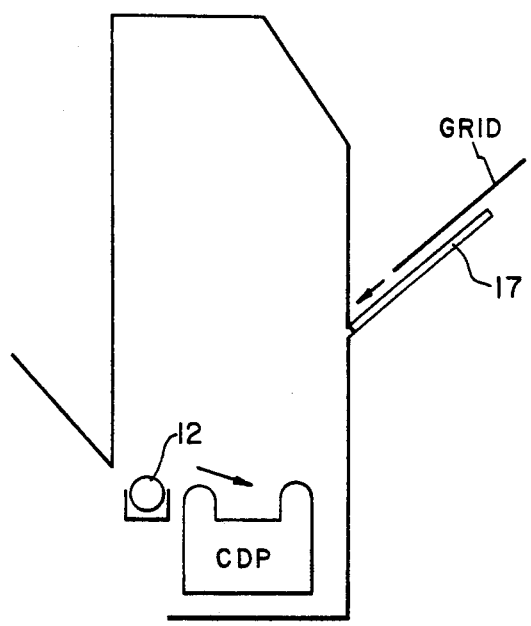
FIG. 6 illustrates the steps of mounting the covers on the reproduction unit and loading discs in the unit.

In a first example of the juke box shown in FIG. 6 the grid on the backing is mounted behind a glass or perspex cover 17 which is normally retained by clips which engage the edge of the cover. These clips are released to allow the cover to be at least partially removed as shown in the figure so that the old grid can be removed and the new grid put in place when the player is loaded with a fresh batch of discs. Alternatively the grid and backing 18 may be covered with a clear plastic laminate 19 in which case it may be mounted on the reproduction unit without requiring any protective cover. In this case the laminated grid is held directly by clips which engage its edges.

Figure 1B:
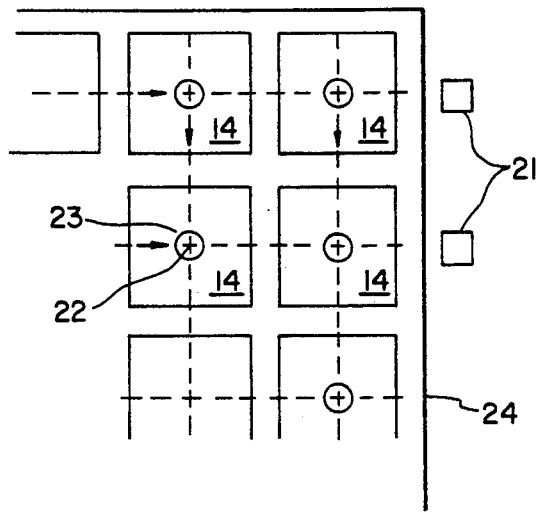

In an alternative and preferred example, each photographically reduced cover is fitted into an individual transparent plastic holder. The holders then clip into the front of a moulded plastic light box mounted on the front of the juke box and consisting of up to seventy-two sections. Each cover is individually lit from behind by a small bulb in the light box. As described in further detail below the bulbs are switchable between OFF, DIM and BRIGHT states. The back of the plastic holders, that is the side towards the light box, is frosted so that the light from the bulb is diffused. In this example, the cover holders are sent out with the compact discs and are changed on location by simply releasing a small clip on the plastic light box and slipping the existing holder out. The light box assembly with the clips for the cover holders pulls forward out of the machine for ease of operation by the person changing the disc. The glass panel 24 which overlies the grid of individual covers 14 in their plastic holders lies flush with the light box holding the covers when the machine is closed. The glass panel is printed with circles 23 indicating to the user where each cover should be touched in order for the selection to be detected by the touch sensitive system. As shown in the enlarged detail of FIG. 1, each circle 23 surrounds the corresponding intersection point 22 of the touch-sensitive grid.

Figure 8:
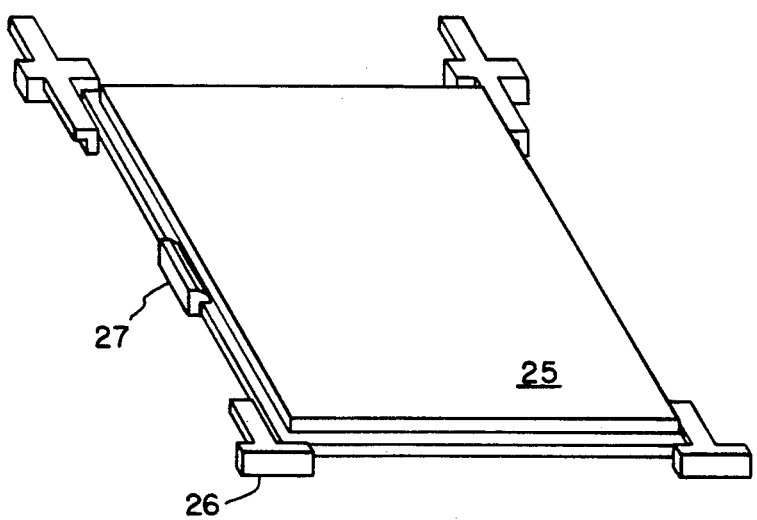
FIG. 8 is a perspective view of a single plastic holder and a corresponding fitting.

FIG. 8 shows a single plastic holder 25 and the corresponding fitting 26,27. In use an entire grid of the fittings 26,27 is formed in front of the light box on the reproduction unit so as to support the grid of photographically reproduced colours in their respective plastic holders 25. The fitting 26,27 includes a resilient clip 27 which normally engages a peripheral stepped portion of the holder 25. The clip 27 is formed from a resilient plastics material and is deformable away from the holder 25 to release the holder when it is desired to change the cover in the holder.

Figure 9:
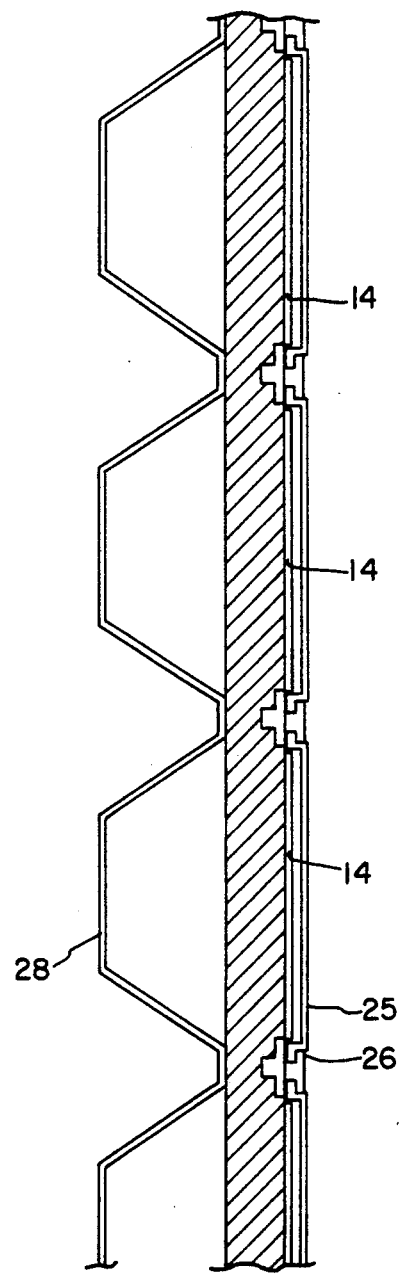
FIG. 9 is partial sectional view of a light box and plastic holders mounted to the light box.
Figure 10:
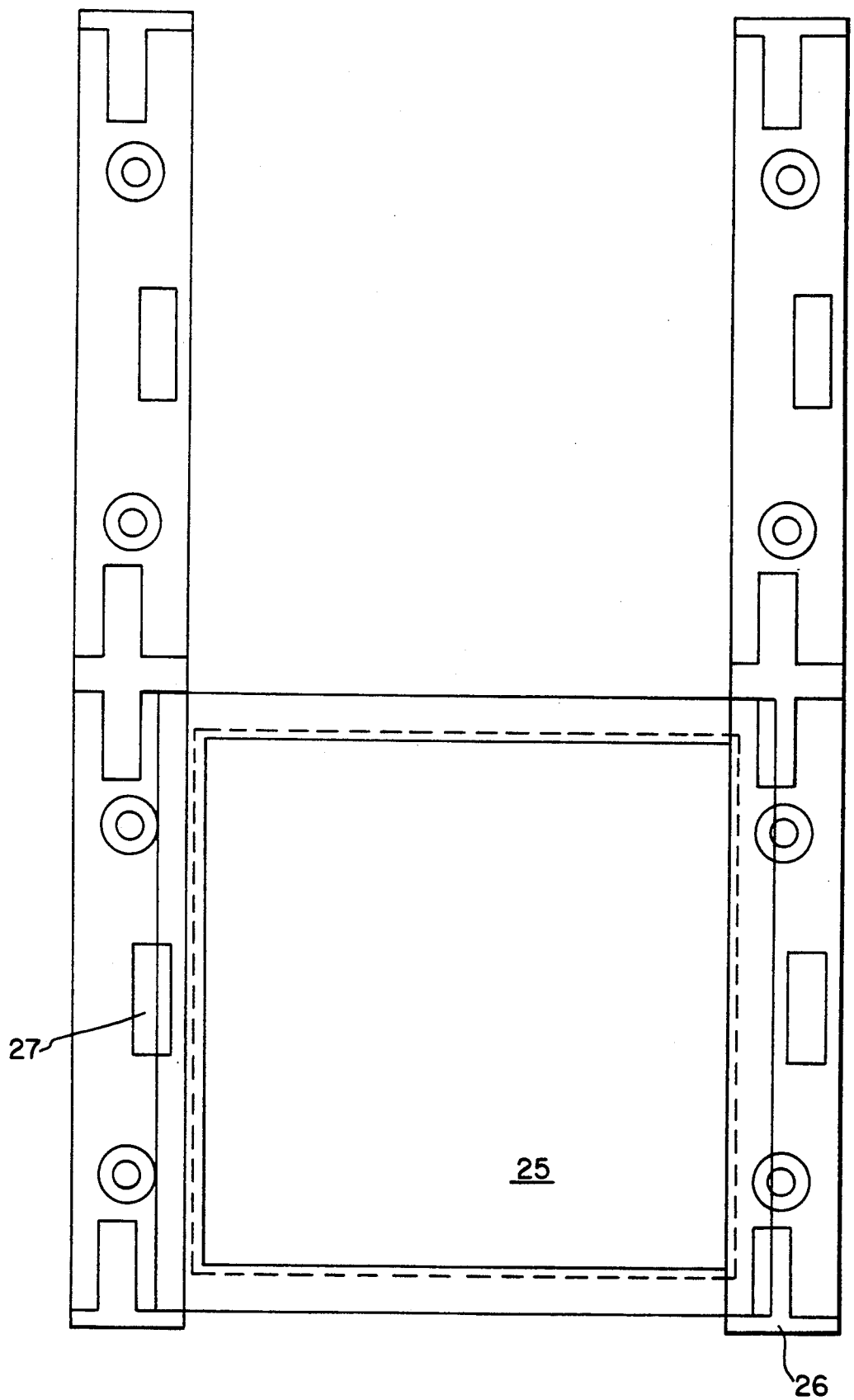
FIG. 10 is a front elevation of two adjacent fittings for plastic holders.

FIG. 9 is a section through part of the complete grid showing the fittings 26 mounted in a support 29 in front of the light box 28. For clarity the glass cover which is normally fitted in front of the light box is omitted from FIG. 9. As indicated schematically in FIG. 10, a respective bulb 30 in the light box 28 is mounted behind each holder 25.

The rim of the unit around the grid has miniature infra red detectors set into it at intervals on all four sides —12 horizontally and 6 vertically in the case of a free standing juke box and 5 horizontally and 12 vertically in the case of a wall box. The system runs in an attract mode on the monitor until money is inserted which then starts the selection process.

The centre of each CD cover is marked by a fine grey circle printed on the glass which indicates to the user the exact contact area to which the infra red system is sensitive. When the user touches this area this is detected by the infra red system and an appropriate signal conveyed to the control system. This particular cover is then illuminated by the corresponding bulb in the light box and the tracks of the particular CD are displayed on the monitor. Typically ten tracks are displayed and a page button provided for the display of remaining tracks. A particular song is then selected by pressing the number of the corresponding track on the keypad mounted on the unit.

To aid selection by the user, the grid may be divided into sub-arrays, each sub-array having covers corresponding to a single musical category such as rock, pop or soul etc. When in the "attract" mode if a particular category is selected then all the CDs in this section light up and are listed on the monitor.

As an alternative to the use of the touch sensitive grid the user may choose a CD simply by entering its number on the keypad.

The electronic control system for the apparatus is described in further detail below.

Figure 11:
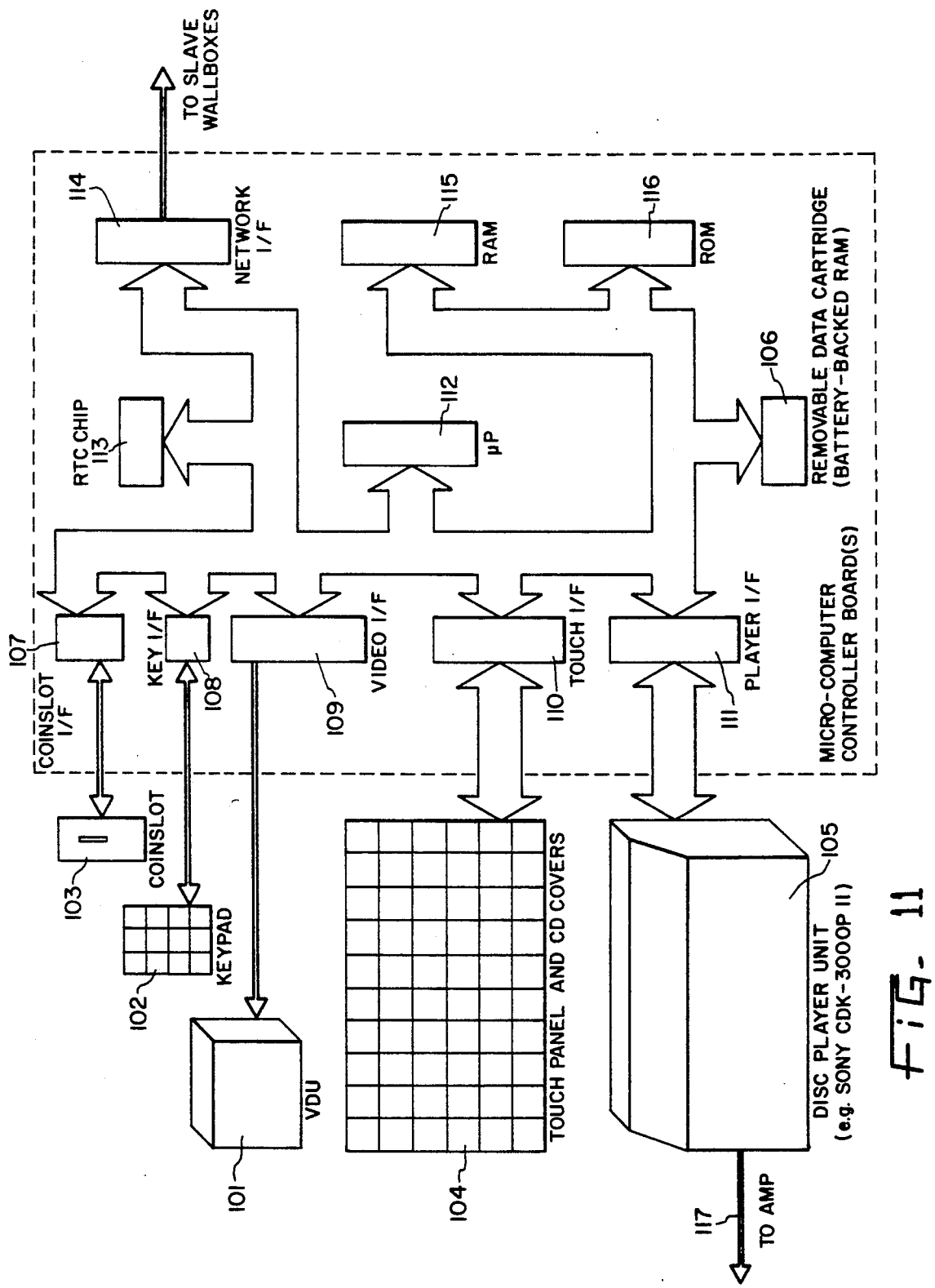
FIG. 11 is a block diagram showing data flow.
Figure 12:
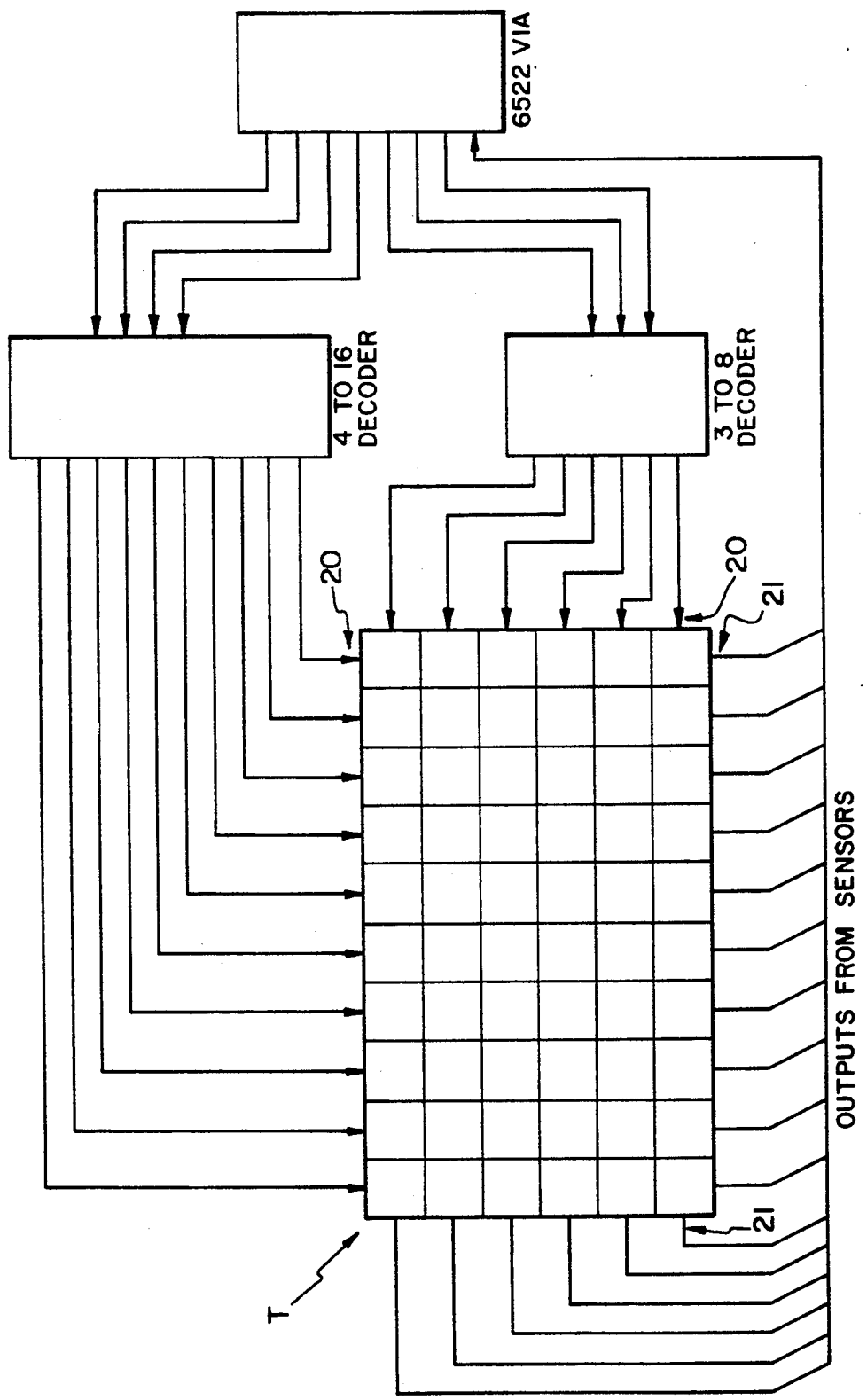
FIG. 12 is a block diagram showing a infra-red scanning system.

The apparatus shown in FIG. 11 consists of a microcomputer controller system (106–116) plus a number of peripheral devices (101–105). The following section describes the functions and other details of each item.

VDU (VISUAL DISPLAY UNIT) 101

This is used to display information to the end user of the apparatus including:
the titles of the tracks on a selected disc
the 'price of play' being used (i.e. the amount of money that must be inserted to enable a selection to be made)
the identity of the selection currently being played
the amount of credit available (i.e. the number of selections that can be made before any more money must be added)
advertising information
any numbers entered on the keypad (102)

The display on the VDU is generated by the video interface hardware (109) on the controller board, which is controlled by the micro-processor and the operating software.

The VDU is mounted in the front panel of the apparatus.

KEYPAD (102)

This is a numerical keypad containing the numbers 0 to 9 and special function keys CANCEL and MORE. The keypad is used to enter the track number of the selection required, once the disc has been selected from the touch panel (104). The CANCEL key clears any partially entered numbers. The MORE key displays the next screenful of tracks if the selected disc contains more than will fit onto the VDU in one go.

Typically, the keypad will be a membrane type, but other button types could be used.

Software on the micro-controller board can scan the keypad and read the identity of any key being pressed via the keypad interface (108).

COINSLOT (103)

The coinslot is a unit such as the MARS III coin handler. Typically it can recognise and report the insertion of four different denominations of coin, rejecting any invalid coins.

An alternative unit may be used that also allows for bank notes to be inserted for use in certain countries.

The insertion of a valid coin is reported via a parallel connection to the coinslot interface. The software reacts accordingly, allowing selections to be made if the required value or more has been inserted.

TOUCH PANEL AND CD COVERS (104)

Typically, the photo-reduced CD covers are mounted behind a glass cover. Behind each CD cover is a light, which can be used to illuminate the cover dimly or brightly. Each row and column of CD covers is crossed by an infra red beam. By repeatedly scanning this matrix, the software on the micro-controller board can determine where the beams have been broken and therefore which CD has been selected.

When a selection is made, the light behind that cover lights brightly and the track corresponding to the selected CD are displayed on the VDU (101). Touching a different cover causes it to light up and its tracks to be displayed. The required track is selected by entering the number on the keypad (102).

Other types of touch technology can also be used to sense the position of a finger over the touch panel. These methods include resistive or capacitive coatings, or surface acoustic wave (ultrasound) technologies.

DISC PLAYER UNIT (105)

In the diagram this is shown as a Sony CDK-3000PII autodisc loader, which has a capacity of 60 compact discs. The unit contains the complete CD player laser and digital audio circuitry, and a disc changer mechanism. It is understood that other units, capable of playing different numbers of compact discs or other recorded media may be used as an alternative.

The unit receives commands from the controller software via the parallel player interface (111). The status of the player can also be read via this interface.

REMOVABLE DATA CARTRIDGE (106)

This is a battery-backed RAM cartridge, with a capacity of at least 32 Kilo-bytes. The main function of the cartridge is to store the titles of each disc and track currently in the apparatus so it is replaced whenever the disc contents of the apparatus is changed.

The contents of the cartridge are prepared at the site from where the CDs are issued.

The cartridge is also used to store configuration data for the functions of the apparatus and records statistical data about the use of the system. When the cartridge is returned to the central CD issue site this data can be analysed.

Configuration data includes:

the name of the establishment at which the apparatus is used the 'price of play' for the unit times and days of the weeks at which the apparatus will play selections at random, known as BGM or Background Music Statistical data includes:

a log of the number of selections made in each hour since the cartridge was installed in the apparatus the number of times each disc and track has been selected the total number of selections made the amount of money inserted into by the apparatus

COINSLOT I/F (107)

This consists of the buffering and address decoding needed to connect the coin mechanism to the microprocessor's address and data busses. It takes the form of an I/O which can be read by the software to determine the type of coin inserted. An output line is used to disable the coin mechanism so that all coins are rejected in case of some fault in the apparatus that prevents selections being played.

KEY I/F (108)

This consists of a matrix and scanning hardware for the keypad. When a key is pressed, the micro-processor is interrupted and the identity of the key pressed can be read via the data bus.

VIDEO I/F (109)

The video interface contains the hardware needed to generate a raster scan video display from a set of data in the micro-computer's RAM. Typically, this is achieved using a video controller device such as the Motorola 6845 CRTC in conjunction with a SA5050 teletext display generator chip.

The contents of the display are determined by the software storing data in the correct format in the appropriate area of RAM.

TOUCH I/F (110)

This interface takes the form of an I/O port and multiplexing and de-multiplexing circuits. The interface allows each row and column of infra red beams and sensors to be enabled in turn under software control, and the back-lighting system to be controlled.

PLAYER I/F (111)

This consists of buffers and drivers conforming to the requirements of the CDK-3000PII and the address decoding needed to connect to the microprocessor. The interface takes the form of an I/O port, writing to which sends commands to the CDK-3000P and reading returns the player's status.

μP (112)

Typically this is an eight bit microprocessor such as the 65C02. However, it is understood that different devices such as 16 bit microprocessors or a micro-controller could equally well be used. The μP connects to the peripheral interfaces (107,108,110,111,114), the data cartridge (106), the RTC chip (113), RAM (115) and ROM (116) via the main address and data busses and interrupt lines.

RTC CHIP (113)

The RTC (real time clock) provides a master clock by which certain timing operations are performed such as the logging of selections made and periods of BGM. The time can be read and set under software control.

NETWORK I/F (114)

The network system allows a number of slave units to be connected to a master unit. Slave units, or terminals, are effectively cut down versions of the master apparatus being discussed here and exclude the Disc Player Unit (105) and AMP (117). Slave units can be situated in other areas of the establishment which receives the same programme feed (music etc) from the master unit. Selections can therefore be made in parallel from a number of slave units and/or the master at the same time.

The slave units are also referred to as 'Wallboxes'.

The network interface is typically RS-232C or equivalent, allowing a serial communication of data to take place between the master and slaves. Slaves are connected together in a ring, allowing new stations to be added by enlarging the ring.

When a selection is made on a slave, it transmits the selection to the master rather than controlling the CDK-3000P directly.

RAM (115)

This is the main area of random access memory, used for general workspace, video display and so on.

ROM (116)

This contains the main operating software for the apparatus. New versions of software can be installed by replacing the ROM.

AMP (117)

This is a high quality two or four channel audio amplifier with a remote volume control facility and a means by which the audio level can be switched to a lower level under the control of the micro-computer controller. This facility is used for the BGM function, such that background music plays at a lower level than real selections.

The output of the amplifier feeds loudspeakers distributed around the establishment.

TOUCH PANEL DETAIL

Figure 2:
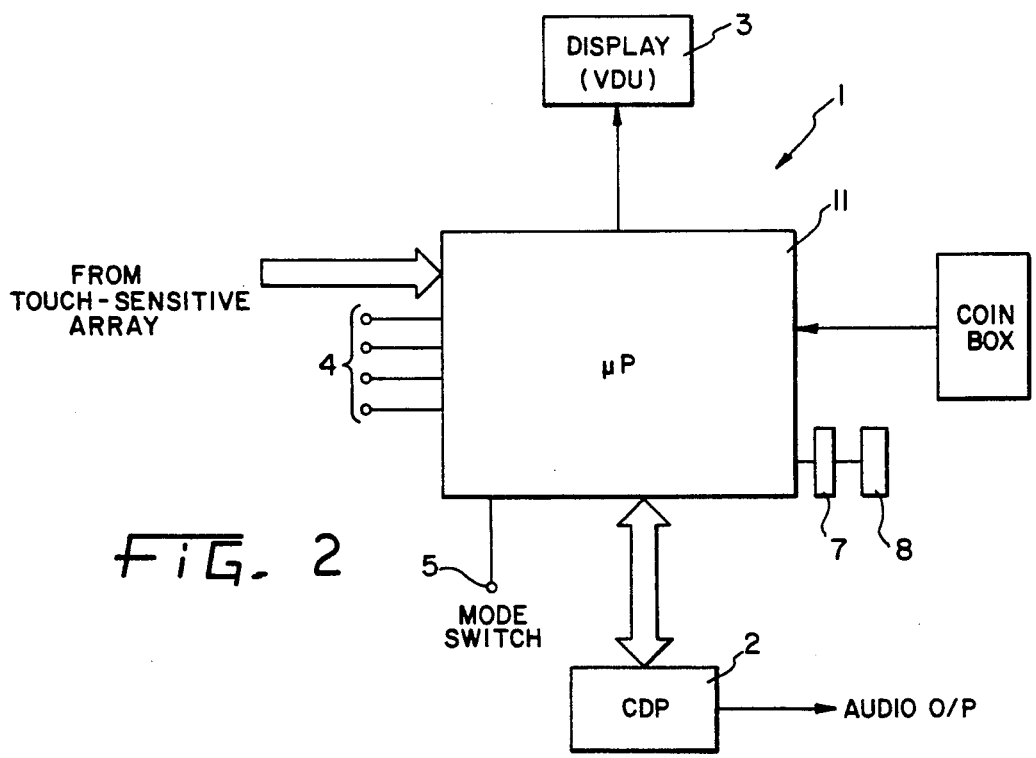
FIG. 2 is a block diagram.
Figure 3A:
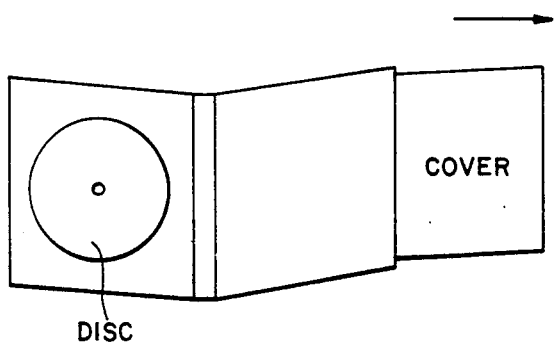
Figure 3B:
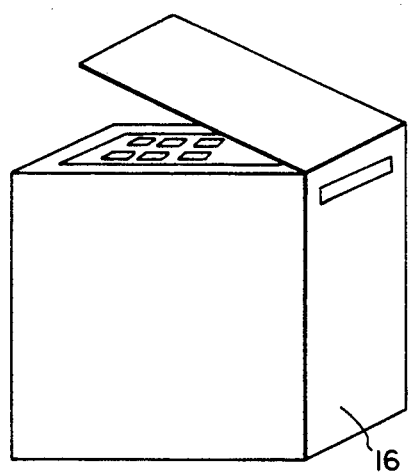
Figure 4:
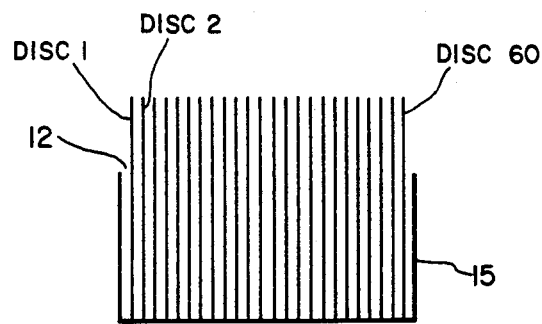
FIG. 4 illustrates the step of collating CD covers and loading the covers in a cartridge.
Figure 5:
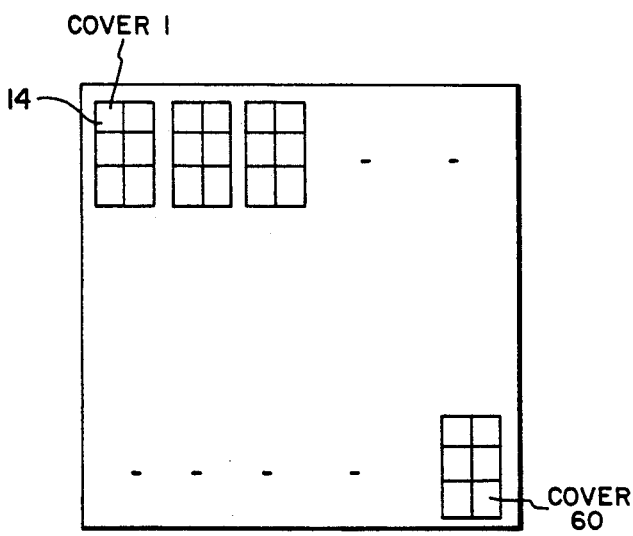
FIG. 5 illustrates the formation of the grid.
Figure 7:
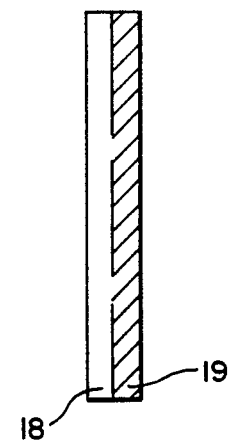
FIG. 7 is a sectional view illustrating an alternative structure for the grid.

FIG. 2 shows the scanning system for the infra red version of the touch panel system. It is described below.

INFRA RED SCANNING SYSTEM

This is shown as a matrix of 10 columns by six rows, with a spacing of around 10 cm (the size of the reduced CD covers). The infra red transmitters 20 are shown at the top and right hand side of the matrix and the receivers 21 are shown on the left and along the bottom. (In practice, the order of the transmitters and receivers may well be different, even to the stage of alternating the direction along the rows and columns to prevent unwanted spill from neighboring transmitters.)

The software on the micro-controller board can turn on one of infra red transmitters by writing appropriate value into the I/O port, shown as 6522 Versatile Interface Adaptor (VIA). The 4 to 16 and 3 to 8 decoders de-multiplex the value into a single line which controls the transmitter via a suitable transistor driver (not shown). If the beam reaches the receiver then a logic TRUE is presented (via suitable buffering) back to the 6522 VIA where it can be read by the software. If the beam is prevented reaching the receiver then a logic FALSE will be presented, indicating that an object such as a finger is positioned in that row or column.

SOFTWARE SCANNING

A single software module is used to scan the panel and return the number of any disc being 'touched' to the calling routine. First of all, each of the rows are scanned in turn. If one of the beams is shown to be broken then the columns are scanned in a similar loop to find out the position of the intersection. Given the row and column, the disc number can be calculated. If none of the row beams are broken then the columns are not scanned, which will be the case for most of the time.

BACKLIGHTING

A similar circuit is used to drive the light bulbs that provide backlighting behind each of the CD covers. There are three possible states, under software control; all off, all on dimly, or one on brightly and the others off.

When a coin is inserted, all lamps come on dimly to indicate that a choice can be made. When one of the covers is touched, the lamp under it lights brightly, the others go off and the tracks are displayed on the VDU. Once the selection has been made, the lamps all go off, unless there are further selections available, in which case the selection process is repeated.

SELECTION METHOD—SOFTWARE FLOW CHART

Figure 13:
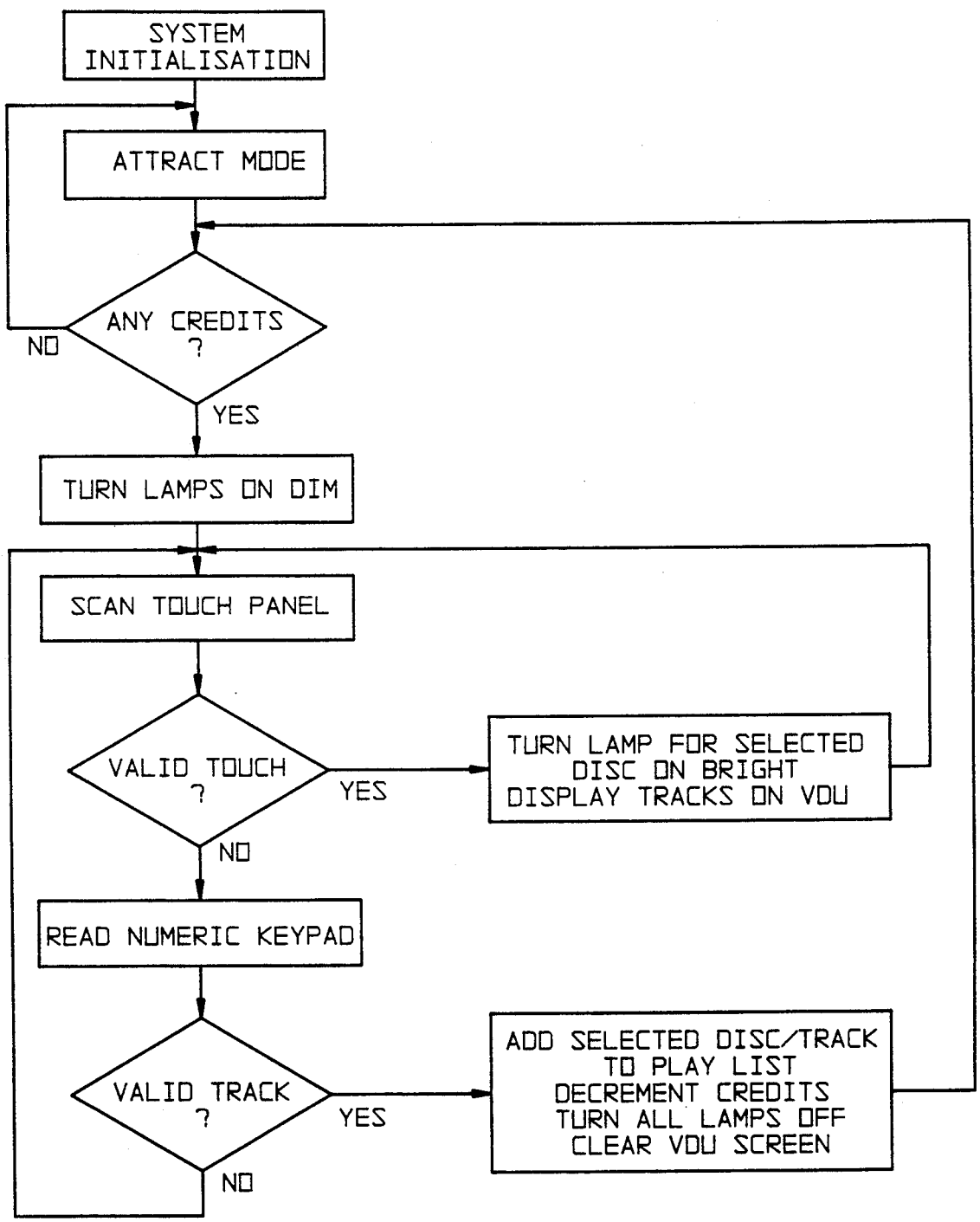
FIG. 13 is a flow chart of software for controlling a reproduction unit.

FIG. 13 shows a simplified flow chart of the foreground software program, which special emphasis on the touch panel scanning routine.

Control of the coin slot, CD player, wallbox network etc are all performed as part of a separate asynchronous background task and are not shown. The foreground program best describes the overall operation of the apparatus.

I claim:

1. A method of controlling a musical reproduction unit for playing digitally encoded records, comprising assembling a plurality of digitally encoded records, photographically reducing covers of said records, loading said records in a musical reproduction unit arranged to play a selected one of said records in response to a choice made by a user, and mounting said photographically reduced covers on said unit in an array so that all covers for all records that are loaded in the unit are viewable at one time, whereby a user is enabled to choose a record by entering in said unit firstly an indication of a corresponding cover, and playing one of said records in response to a user selection made by touching a particular one of said covers.

2. The method of claim 1, wherein said digitally encoded records are compact discs.

3. The method of claim 2, wherein said covers are mounted on said reproduction unit in a regular array, the method further comprising programming said reproduction unit with data correlating positions of covers in said array and respective corresponding records, whereby said unit is responsive to an input from said user indicating a position of a cover to select a corresponding record for playing.

4. The method of claim 3, wherein said data correlating said position and said covers is provided in a programmable data cartridge, said method further comprising fitting said programmable data cartridge to said reproduction unit.

5. The method of claim 4, wherein title information for each compact disc is stored in said data storage cartridge, said method further comprising displaying title information for a chosen compact disc on visual display means.

6. A musical reproduction unit for playing digitally encoded records comprising a plurality of digitally encoded records loaded in the unit, the unit comprising:
photographically reduced covers of the records mounted on the unit in an array so that all covers for all said records that are loaded in said unit are viewable at one time;
a sensing means associated with at least one of said photographically reduced covers, said sensing means adapted to be activated by a user by touching a particular one of said covers and thereby selecting said particular cover; and
control means electrically connected with said sensing means, said control means adapted to operably play the record indicated by the selected cover when selected by a user.

7. The apparatus of claim 6, wherein said photographically reduced covers are mounted on said musical reproduction unit in a regular array, said control means is loaded with data correlating positions of covers in said regular array and respective corresponding records.

8. The apparatus of claim 7, wherein said control means include a programmable data cartridge fitted to said unit.

9. The musical reproduction unit of claim 8 wherein said programmable data cartridge includes title information for each recording and further including a visual display means on which said title information is displayed.

10. The apparatus of claim 7, wherein said musical reproduction unit includes touch sensitive means associated with said array of covers and operatively connected to said control means.

11. The apparatus of claim 10, wherein said touch-sensitive means comprise a plurality of infra-red emitters and detectors arranged along edges of said array, thereby providing a touch-sensitive grid comprising a plurality of intersection points corresponding to respective covers of said array.

12. The apparatus of claim 11, further comprising means for visually indicating to the user regions of said covers corresponding in position to said intersection points.

13. The apparatus of claim 12, wherein each of said photographically reduced covers is positioned within a transparent holder and said transparent holder is releasibly mounted on said musical reproduction unit.

14. The apparatus of claim 12, wherein said apparatus further comprises a transparent cover overlying said photographically reduced covers mounted on said musical reproduction unit and said means for visually indicating comprise marks formed on said transparent cover at predetermined positions, corresponding with said intersection points.

15. The apparatus of claim 7, wherein said musical reproduction unit includes means for illuminating selected ones of said photographically reduced covers responsive to said control means.

16. The musical reproduction unit of claim 6 wherein the digitally encoded records are compact discs.

* * * * *